United States Patent
Naslund et al.

(10) Patent No.: US 9,572,151 B2
(45) Date of Patent: Feb. 14, 2017

(54) APPARATUSES AND METHODS FOR ESTIMATING POWER USING DATA SIGNALS

(71) Applicant: Telefonaktiebolaget L M Ericsson (publ), Stockholm (SE)

(72) Inventors: Lars Naslund, Solna (SE); Oskar Mauritz, Johanneshov (SE); Ying Sun, Sundyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 147 days.

(21) Appl. No.: 14/427,831

(22) PCT Filed: Oct. 9, 2012

(86) PCT No.: PCT/IB2012/055456
§ 371 (c)(1),
(2) Date: Mar. 12, 2015

(87) PCT Pub. No.: WO2014/057307
PCT Pub. Date: Apr. 17, 2014

(65) Prior Publication Data
US 2015/0215933 A1    Jul. 30, 2015

(51) Int. Cl.
*G01R 31/08* (2006.01)
*H04W 72/04* (2009.01)
(Continued)

(52) U.S. Cl.
CPC ......... *H04W 72/0426* (2013.01); *H04B 17/20* (2015.01); *H04B 17/27* (2015.01);
(Continued)

(58) Field of Classification Search
None
See application file for complete search history.

(56) References Cited

U.S. PATENT DOCUMENTS

| | | | |
|---|---|---|---|
| 2005/0250502 A1* | 11/2005 | Laroia | H04L 5/0007 455/447 |
| 2008/0125144 A1* | 5/2008 | Ruutu | G01S 5/02 455/457 |
| 2010/0159838 A1* | 6/2010 | Wang | H04B 1/7103 455/63.1 |

FOREIGN PATENT DOCUMENTS

| | | |
|---|---|---|
| EP | 2 216 930 A1 | 8/2010 |
| EP | 2 315 476 A1 | 4/2011 |
| WO | 2008/086491 A1 | 7/2008 |

OTHER PUBLICATIONS

International Search Report issued in corresponding International application No. PCT/IB2012/055456, date of mailing of search report Jun. 20, 2013.
(Continued)

*Primary Examiner* — Phirin Sam
(74) *Attorney, Agent, or Firm* — Patent Portfolio Builders PLLC

(57) ABSTRACT

Methods and network devices estimate power of signals received from a user equipment in a sector of a cellular network cell using a data signal, which is not a predetermined reference signal. An exemplary method includes (1) saving a data signal received from the user equipment in a first sector of the cellular network cell, (2) acquiring a reference signal that corresponds to the data signal as received in a second sector of the cell and demodulated, and (3) comparing the saved data signal and the reference signal to estimate power of the data signal as received in the first sector.

25 Claims, 5 Drawing Sheets

(51) Int. Cl.
  *H04W 64/00*   (2009.01)
  *H04L 5/00*   (2006.01)
  *H04B 17/20*   (2015.01)
  *H04B 17/27*   (2015.01)
  *H04B 17/327*   (2015.01)
  *H04B 17/382*   (2015.01)
  *H04W 24/08*   (2009.01)
  *H04W 48/20*   (2009.01)

(52) U.S. Cl.
  CPC ......... *H04B 17/327* (2015.01); *H04B 17/382* (2015.01); *H04L 5/00* (2013.01); *H04L 5/0051* (2013.01); *H04W 24/08* (2013.01); *H04W 64/00* (2013.01); *H04L 5/0048* (2013.01); *H04W 48/20* (2013.01)

(56) References Cited

OTHER PUBLICATIONS

Written Opinion of the International Searching Authority issued in corresponding International application No. PCT/IB2012/055456, date of mailing Jun. 20, 2013.

* cited by examiner

Cell A

Cell A

APPARATUSES AND METHODS FOR ESTIMATING POWER USING DATA SIGNALS

TECHNICAL FIELD

The present invention generally relates to apparatuses and methods for estimating power received from a mobile unit in different sectors using data signals.

BACKGROUND

Interest in using mobile and landline/wired computing devices in day-to-day communications has been increasing in recent years. Many of today's wireless data networks comply with Long Term Evolution (LTE) standards for wireless data communications technology. In LTE, the capacity and speed of wireless data networks are increased by using digital signal processing and modulations techniques in the context of an Internet Protocol-based network architecture, yielding significantly reduced transfer latency compared to previous wireless data networks (e.g., 3G).

Recently, a concept called shared cell (also known as "cell merge" or "multi-sector cell") has been developed in the context of the LTE standard. In contrast to regular LTE deployment, in which each sector is associated with a cell identifier (ID), in a shared cell concept deployment, one cell ID is associated with (i.e., used for) several sectors.

FIG. 1 illustrates a regular LTE deployment, in which each sector 10, 20, and 30 is associated with an individual cell identifier (ID). One cell ID, "Cell A", is associated with higher power and wider spatial coverage antenna 10 (which may be part of a base station); another cell ID, "Cell B", is associated with antenna 20; and yet another cell ID, "Cell C", is associated with antenna 30.

FIG. 2 illustrates an LTE deployment using the shared cell concept in which the same cell identifier, "Cell A", is associated with antennas 40, 50, and 60.

Two advantages of using shared cell deployment are (1) reduced amount of Cell-specific Reference Signal (CRS) interference in downlinks, and (2) no handover needed when user equipment (UE) moves from one sector to another having the same cell ID.

Shared cell deployments use Spatial Division Multiplexing (SDM) to handle the capacity problem, i.e., to schedule spatially separated users (those who do not interfere with each other), located in the same cell but in different sectors, at the same time. FIG. 3 illustrates an LTE system with shared cell using SDM (antennas 70, 80, and 90 are associated with the same cell ID, "Cell A"). A first communication of UE 85 associated with antenna 80 may occur in the same time slot and the same frequency as a second communication of UE 95 associated with antenna 90 if the respective communications' signals do not interfere. In order to determine which users' communications interfere, powers of the same signal emitted from an individual UE and received in different sectors are measured.

The power measurements indicate in which sector or sectors the UE is located (the UE may be located in several sectors at the same time). That is, if the received power of the UE's emitted signal exceeds a predetermined threshold in a sector, the UE is located in the respective sectors. If two UEs are located in the same sector, they may interfere with each other and, therefore, should not be scheduled at the same time.

Intuitively, one would foresee such power measurements using predetermined reference signals such as a Demodulation Reference Signal (DMRS) or a Sounding Reference Signal (SRS). A description of these reference signals is provided in the current 3GPP documentation (e.g., up to release 11).

Currently, the DMRSs are cell-specific, which means that all UEs in a cell will have the same DMRS, making it impossible to distinguish between UEs in the same cell if the UEs are using the same resources (i.e., frequency and time slot). Although it is possible that, in the future (e.g., devices designed based on 3GPP release 11 documentation), UEs will be able to support UE-specific DMRS, UEs currently in use cannot be distinguished based on the DMRS and, therefore, power measurements cannot be performed using these predetermined reference signals.

The SRS is a UE-specific symbol and, thus, SRS emitted by different UEs can be distinguished from each other. However, emitting SRS uses resources that could have been used for data transmission, which results in reduced data rates.

Accordingly, it would then be desirable to provide methods and devices for estimating the power of UE signals received in different sectors without using reference signals.

SUMMARY

Methods and devices as set forth below are capable of estimating powers of data signals emitted by UE and received in different sectors without using predetermined reference signals. The frequency of alternative power measurements (e.g., using predetermined reference signals such as SRS) may be decreased or eliminated. By decreasing the frequency of emitting predetermined reference signal, data rates may be increased, and received power may be estimated in different sectors within the shared cell.

According to an exemplary embodiment, there is a method for estimating power of signals received from a user equipment in a sector of a cellular network cell. The method includes saving a data signal received from the user equipment in a first sector of the cellular network cell. The method further includes acquiring a reference signal that corresponds to the data signal as received in a second sector of the cellular network cell and demodulated. The method also includes comparing the saved data signal and the reference signal to estimate power of the data signal received in the first sector. The data signal is not a predetermined reference signal.

According to another exemplary embodiment, a network device for estimating power received in a sector of a cellular network cell has a communication interface and a data processing unit. The communication interface is configured to enable communication with other network devices. The data processing unit is connected to the communication interface and is configured (1) to save a data signal received from a user equipment in a first sector of the cell, (2) to acquire a reference signal that corresponds to the data signal as received and demodulated in a second sector, and (3) to compare the saved data signal and the reference signal to estimate power of the data signal received in the first sector. The data signal is not a predetermined reference signal.

According to yet another exemplary embodiment, a network device for enabling power estimation in sectors of a cellular network cell in a cellular network has a communication interface and a data processing unit. The communication interface is configured to enable communication with other network devices. The data processing unit is connected to the communication interface and is configured to receive a data signal from a user equipment in a first sector, to demodulate the data signal, and to transmit the demodulated data signal to enable a comparison of the demodulated data signal with a data signal as received in a second sector, thereby estimating power of the data signal received in the second sector. The data signal is not a predetermined reference signal.

According to another exemplary embodiment, there is a computer-readable medium non-transitory storing executable codes which, when executed on a network device, make the network device execute a method for estimating power of signals received from a user equipment in a sector of a cellular network cell. The method includes saving a data signal received from the user equipment in a first sector of the cellular network cell. The method further includes acquiring a reference signal that corresponds to the data signal as received in a second sector cellular of the network cell and demodulated. The method also includes comparing the saved data signal and the reference signal to estimate power of the data signal received in the first sector. The data signal is not a predetermined reference signal.

An objective of some embodiments is to provide an alternative to measuring power received from a UE in a sector of a cellular network cell using predetermined reference signals. This objective is accomplished by using data signals to estimate the power and thereby allowing to reduce or eliminate using network resources for transmitting predetermined reference signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an LTE radio communication system with shared cells. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures, or characteristics may be combined in any suitable manner in one or more embodiments.

In the methods and devices described below, instead of using predefined reference signals (DMRS and SRS) to measure power, data signals are used to estimate the power. The data signal received in a first sector is demodulated and transmitted as a reference signal to be compared with the saved data signal as received and saved in a second sector, in order to estimate the power in the second sector.

Figure 1:
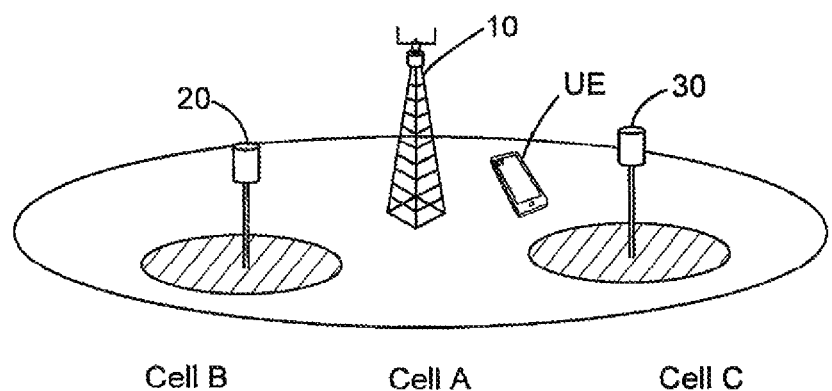
FIG. 1 is a schematic diagram of a regular LTE deployment.
Figure 2:
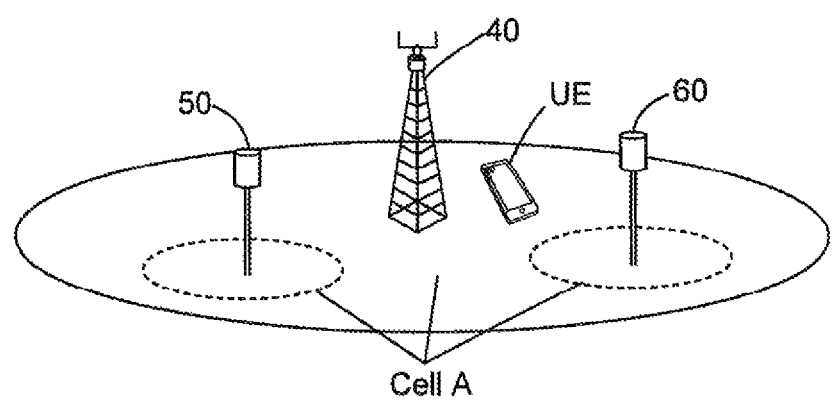
FIG. 2 is a schematic diagram of an LTE deployment using the shared cell concept.
Figure 3:
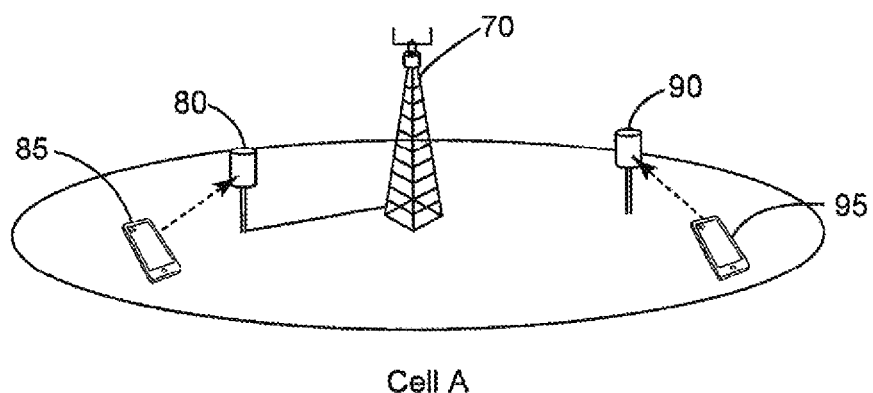
FIG. 3 is a schematic diagram of an LTE system using SDM.
Figure 4:
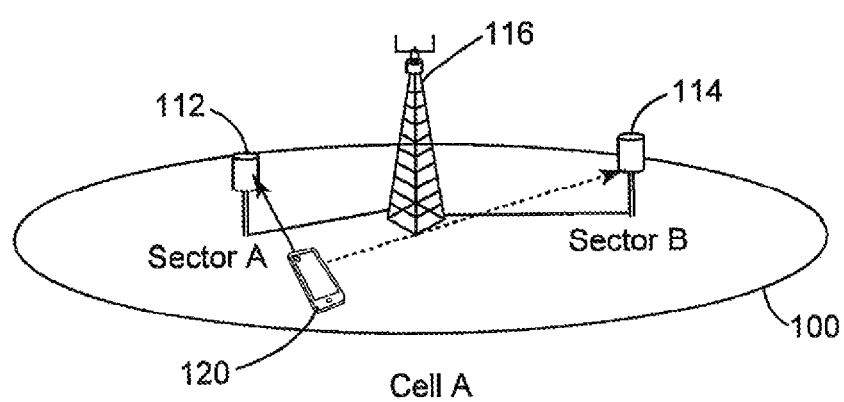
FIG. 4 is a schematic diagram of a system according to an exemplary embodiment.

As illustrated in FIG. 4, in a cell 100 (which may be a shared cell such that all the antennas therein—112, 114, and 116—use the same cell ID, "Cell A"), UE 120 emits a data signal which is received by antenna 112 (as suggested by the continuous-line arrow), and by antenna 114 (as suggested by the dashed-line arrow). Antenna 112 and antenna 114 may communicate with the base station 116.

Figure 5:
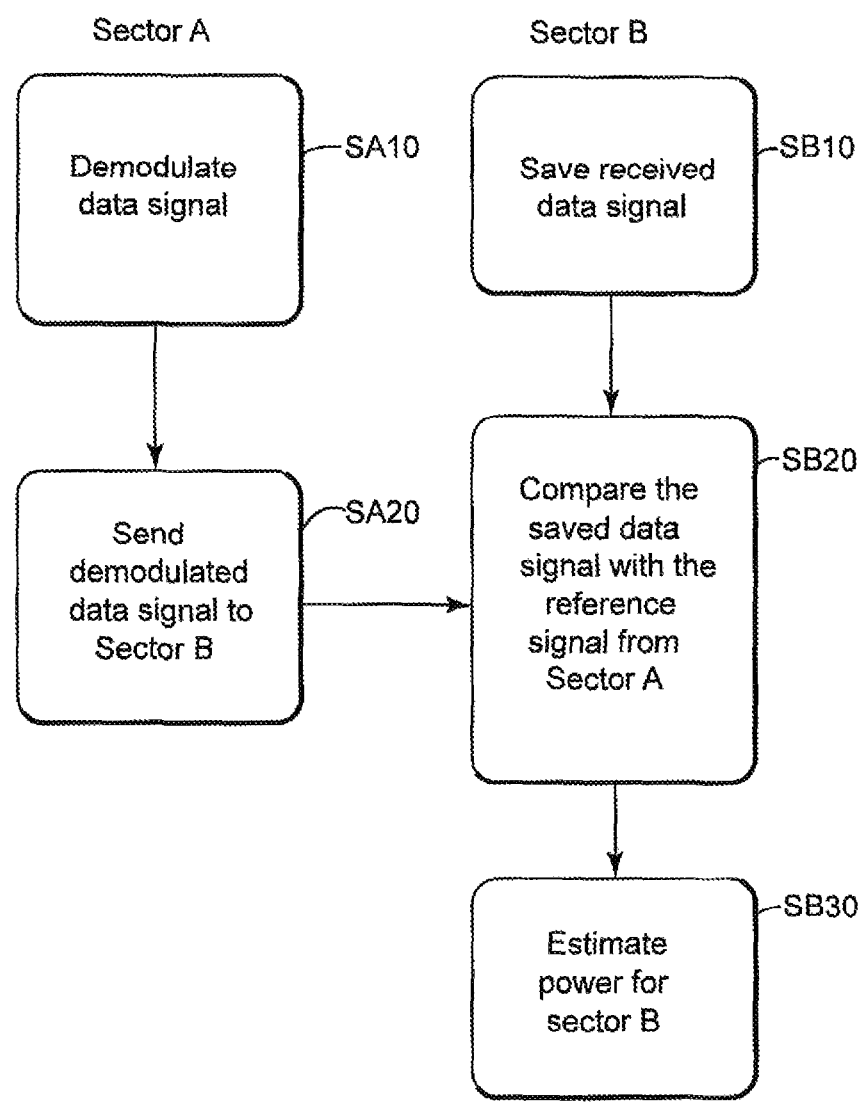
FIG. 5 is a flowchart of operations related to different sectors according to an exemplary embodiment.

FIG. 5 illustrates operations taking place in network devices of Sector A and Sector B in order to estimate the power of signals received from UE 120 in Sector B. A data signal emitted by UE 120 reaches antennas 112 and 114 of Sector A and Sector B. In a network device of Sector A, the data signal (including one or more symbols) received by antenna 112 is demodulated at step SA10, and then the demodulated data signal is transmitted to Sector B at SA20. In a network device of Sector B, the data signal (including one or more symbols) received by antenna 114 is saved at SB10. Upon receiving the demodulated data signal from Sector A (which signal serves as a reference signal), the network device of Sector B compares the saved data signal with the reference signal at SB20. Then, based on the comparison at SB20, the network device of Sector B estimates the power in Sector B at SB30. The data signal includes at least one symbol, but may include several symbols. The terms "network device of Sector A" and "network device of Sector B" are not intended to be limiting relative to the hardware location, "of A" and "of B" indicating a functional association.

Figure 6:
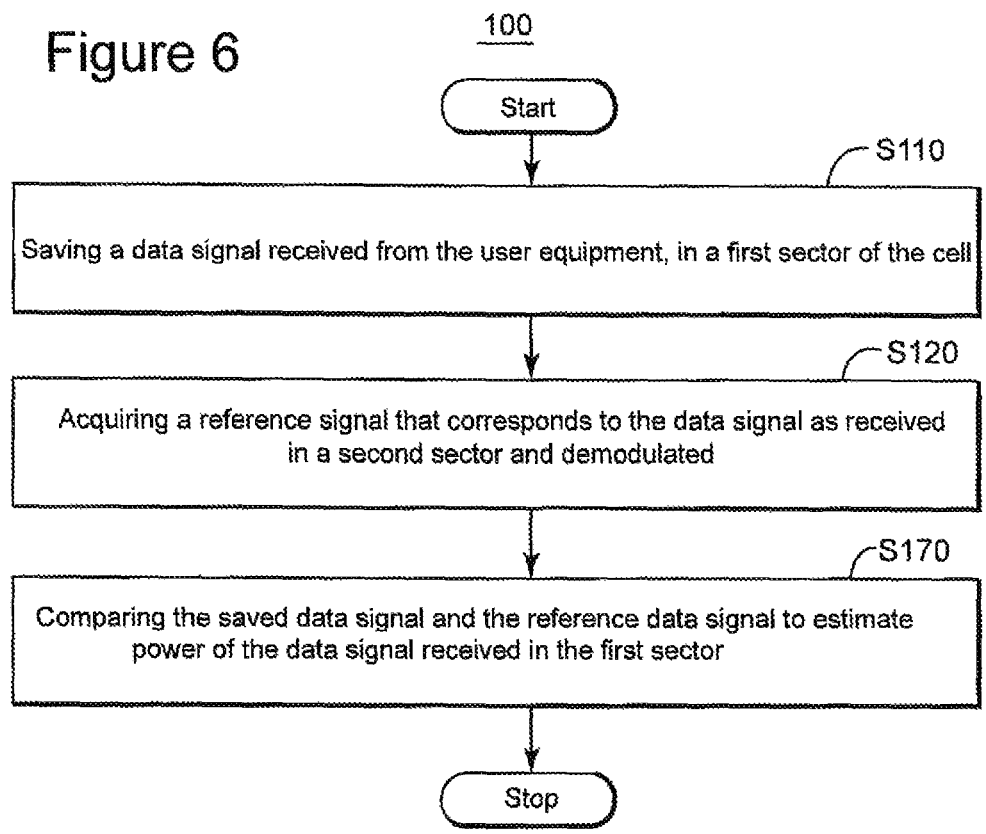
FIG. 6 is a flowchart of a method according to an exemplary embodiment.

FIG. 6 is a flowchart of a method 100 for estimating the power of signals received from a user equipment in a sector of a cellular network cell (for example, a method performed by a network device of Sector B). Method 100 includes saving a data signal received from the user equipment in a first sector (e.g., Sector B) of the cell, at S110. Method 100 further includes acquiring (e.g., receiving) a reference signal that corresponds to the data signal as received in a second sector (e.g., Sector A) of the cell and demodulated, at S120. Method 100 then includes comparing the saved data signal with the reference signal to estimate the power of the data signal as received in the first sector, at S130. Here, the data signal is not a predetermined reference signal such as SRS or DMRS and may include one or more symbols.

The first sector and second sector may be sectors of a shared cell, i.e., use the same cell ID, such as "Cell A". The UE (e.g., 120) may be associated (tuned to communicate) with the second sector (i.e., Sector A). In one embodiment, method 100 may further include associating the user equipment with the first sector if the estimated power exceeds a predetermined threshold value. In another embodiment, method 100 may further include associating the user equipment with the first sector if the estimated power is larger than the power of the data signal as received in the second sector.

The steps S110, S120, and S130, may be performed at predetermined time intervals and/or may be performed when a trigger event occurs. For example, a trigger even may be $n^{th}$ scheduling (n=1, 2, 3, . . . ).

Method 100 may further include acquiring a measured power, determined using a predetermined reference signal received from the user equipment, and comparing the estimated power with the measured power. Further, in one embodiment, acquiring the measured power may be performed at a first time interval and the comparing to estimate the power may be performed at a different second time interval. In another embodiment, the acquiring of the measured power may occur at a different moment than the comparing to estimate the power.

Thus, estimating power using data signals may decrease the frequency of the predetermined reference signals and, therefore, increase the data rate. In fact, using predetermined reference signals to measure power may even be eliminated.

Method 100 may also include evaluating whether a first communication of the user equipment interferes with a second communication of a second user equipment, based on the estimated power.

Figure 7:
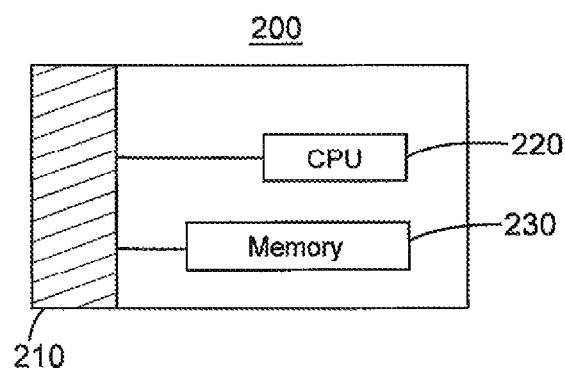
FIG. 7 is a block diagram of a device according to an exemplary embodiment.

A block diagram of a network device 200 capable of executing method 100 is illustrated in FIG. 7. The network device includes a communication interface 210 configured to enable communication with other network devices. The network device 200 also includes a data processing unit 220 connected to the communication interface 210 and configured (1) to save a data signal received from a user equipment in a first sector of the cell, (2) to acquire a reference signal that corresponds to the data signal as received and demodulated by a second sector, and (3) to compare the saved data signal and the reference signal to estimate the power of the data signal received in the first sector. The data signal is not a reference signal such as SRS or DMRS and may include one or more symbols.

In one embodiment, the data processing unit 220 may also be configured to associate the user equipment with the first sector if the estimated power exceeds a predetermined threshold value. In another embodiment, the data processing unit 220 may also be configured to associate the user equipment with the first sector if the estimated power is larger than the power of the data signal as received in the second sector (with which the UE may be initially associated).

The data processing unit 220 may be configured to execute method 100 at predetermined time intervals and/or when a trigger event occurs.

The data processing unit 220 may further be configured to acquire a measured power, determined using a predetermined reference signal received from the user equipment, and to compare the estimated power with the measured power. In one embodiment, the data processing unit 220 may acquire the measured power at a first interval and may compare the saved data signal and the reference signal to estimate the power of the data signal at a different second time interval. In another embodiment, the data processing unit 220 may be configured to acquire the measured power at a different moment than when it compares the saved data signal and the reference signal to estimate the power of the data signal.

The network device 200 may be a base station (e.g., 116 in FIG. 4). The network device may further include a memory 230 non-transitory storing executable codes, making the data processing unit 220 perform methods according to various embodiments described above.

Figure 8:
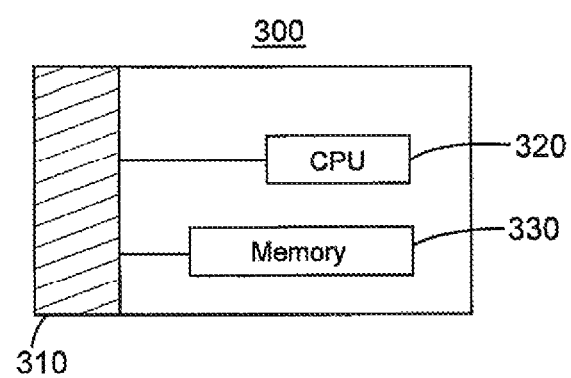
FIG. 8 is a block diagram of a device according to another exemplary embodiment.

FIG. 8 is a block diagram of a network device 300 configured to enable power estimation in different sectors of a cellular network cell. This network device includes a communication interface 310 configured to enable communication with other network devices of the cellular network and a data processing unit 320 connected to the communication interface 310. The network device 300 may also include a memory 330.

The data processing unit 320 is configured to receive a data signal from a user equipment (e.g., 120) in a first sector via the communication interface 310, to demodulate the received data signal, and to transmit the demodulated data signal via the communication interface 310 to at least one second sector to enable a comparison of the demodulated data signal with the data signal as received in the at least one second sector, thereby estimating the power of the data signal received in the at least one second sector. The data symbol is not a predetermined reference signal.

The disclosed exemplary embodiments provide methods and devices for estimating the power of signals received from a user equipment in a sector of a cellular network cell using data signals (not predetermined reference signals). It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method, or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as a floppy disk or magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a specifically programmed computer or processor.

What is claimed is:

1. A method for estimating power of signals received from a user equipment in a sector of a cellular network cell, the method comprising:

saving a data signal received from the user equipment in a first sector of the cellular network cell;

acquiring a reference signal that corresponds to the data signal as received in a second sector of the cellular network cell and demodulated; and comparing the saved data signal and the reference signal to estimate power of the data signal as received in the first sector, wherein the data signal is not a predetermined reference signal emitted by the UE.

2. The method of claim 1, wherein the first sector and the second sector use a same cell ID.

3. The method of claim 1, wherein the UE is associated with the second sector.

4. The method of claim 1, further comprising:
associating the user equipment with the first sector if the estimated power exceeds a predetermined threshold value.

5. The method of claim 1, further comprising:
associating the user equipment with the first sector if the estimated power is larger than power of the data signal as received in the second sector.

6. The method of claim 1, wherein the saving of the data signal, the acquiring of the reference signal and the comparing of the saved data signal and the reference signal are performed at predetermined time intervals.

7. The method of claim 1, wherein the saving of the data signal, the acquiring of the reference signal and the comparing of the data signal and the reference signal are performed when a trigger event occurs.

8. The method of claim 1, further comprising:
acquiring a measured power determined using a predetermined reference signal emitted by the user equipment; and
comparing the estimated power with the measured power.

9. The method of claim 8, wherein the acquiring of the measured power is performed at a first time interval and the comparing to estimate the power is performed at a second time interval, the first time interval being different from the second time interval.

10. The method of claim 8, wherein the acquiring of the measured power occurs at a different moment than the comparing to estimate the power.

11. The method of claim 1, wherein power received in the first sector is not measured using predetermined reference signals.

12. The method of claim 1, further comprising:
evaluating whether a first communication of the user equipment interferes with a second communication of a second user equipment, based on the estimated power.

13. A network device for estimating power received in a sector of a cellular network cell, comprising:
a communication interface configured to enable communication with other network devices; and
a data processing unit connected to the communication interface and configured;
(1) to save a data signal received from a user equipment in a first sector of the cellular network cell;
(2) to acquire a reference signal that corresponds to the data signal as received and demodulated in a second sector; and
(3) to compare the saved data signal and the reference signal to estimate power of the data signal received in the first sector,
wherein the data signal is not a predetermined reference signal.

14. The network device of claim 13, wherein the data processing unit is further configured to associate the user equipment with the first sector if the estimated power exceeds a predetermined threshold value.

15. The network device of claim 13, wherein the data processing unit is further configured to associate the user equipment with the first sector if the estimated power is larger than power of the data signal as received in the second sector.

16. The network device of claim 13, wherein the data processing unit is configured to execute the saving of the data signal, the acquiring of the reference signal and the comparing of the saved data signal and the reference signal at predetermined time intervals.

17. The network device of claim 13, wherein the data processing unit is configured to execute the saving of the data signal, the acquiring of the reference signal and the comparing of the data signal and the reference signal when a trigger event occurs.

18. The network device of claim 13, wherein the data processing unit is further configured
to acquire a measured power determined using a predetermined reference signal received from the user equipment, and
to compare the estimated power with the measured power.

19. The network device of claim 18, wherein the data processing unit is further configured
(A) to acquire the measured power at a first time interval, and
(B) to compare the saved data signal and the reference signal to estimate the power of the data signal at a second time interval,
the first time interval being different from the second time interval.

20. The network device of claim 18, wherein the data processing unit is further configured to acquire the measured power at a different moment than a moment at which compares the saved data signal and the reference signal to estimate the power.

21. The network device of claim 13, wherein the data processing unit is further configured not to acquire a measured power determined using reference signals.

22. The network device of claim 13, wherein the network device is a base station.

23. The network device of claim 13, wherein the data processing unit is further configured to evaluate whether a first communication of the user equipment interferes with a second communication of a second user equipment, based on the estimated power.

24. A network device for enabling power estimation in different sectors of a cellular network cell, comprising:
a communication interface configured to enable communication with other network devices; and
a data processing unit connected to the communication interface and configured to receive a data signal from a user equipment in a first sector, to demodulate the received data signal and to transmit the demodulated data signal to at least one second sector to enable a comparison of the demodulated data signal with the data signal as received in the at least one second sector thereby estimating power of the data signal received in the at least one second sector,
wherein the data signal is not a predetermined reference signal.

25. A computer-readable medium non-transitory storing executable codes which when executed on a network device make the network device execute a method for estimating power of signals received from a user equipment in a sector of a cellular network cell, the method comprising:

saving a data signal received from the user equipment in a first sector of the cellular network cell;
acquiring a reference signal that corresponds to the data signal as received in a second sector of the cellular network cell and demodulated; and
comparing the saved data signal and the reference signal to estimate power of the data signal received in the first sector,
wherein the data signal is not a predetermined reference signal.

* * * * *